United States Patent [19]

Kugele

[11] Patent Number: 4,558,083
[45] Date of Patent: * Dec. 10, 1985

[54] STABILIZER COMPOSITIONS AND POLYMERS CONTAINING SAME

[75] Inventor: Thomas G. Kugele, Cincinnati, Ohio

[73] Assignee: Morton Thiokol, Inc., Chicago, Ill.

[ * ] Notice: The portion of the term of this patent subsequent to Feb. 16, 1999 has been disclaimed.

[21] Appl. No.: 569,542

[22] Filed: Jan. 10, 1984

Related U.S. Application Data

[63] Continuation of Ser. No. 345,822, Feb. 4, 1982, abandoned, which is a continuation-in-part of Ser. No. 238,517, Feb. 26, 1981, Pat. No. 4,315,850.

[51] Int. Cl.$^4$ .............................................. C08K 5/58
[52] U.S. Cl. .................... 524/181; 252/400 R; 524/180; 524/330; 524/333
[58] Field of Search ............... 524/180, 181, 330, 333; 252/400 R

[56] References Cited

U.S. PATENT DOCUMENTS

| | | | |
|---|---|---|---|
| 3,063,963 | 11/1962 | Wooten et al. | 524/181 |
| 3,103,500 | 9/1963 | Tholstrup et al. | 524/330 |
| 3,242,133 | 3/1966 | Lindsey | 524/392 |
| 3,413,264 | 11/1968 | Hechenbleikner et al. | 524/181 |
| 3,542,825 | 11/1970 | Hoye et al. | 524/180 |
| 3,553,163 | 1/1971 | Spacht | 524/330 |
| 3,758,537 | 9/1973 | Wowk | 524/180 |
| 3,890,277 | 6/1975 | Kugele et al. | 524/181 |
| 3,933,680 | 1/1976 | Wowk | 524/180 |
| 4,029,618 | 6/1977 | Dieckmann | 524/177 |
| 4,098,763 | 7/1978 | Starnes | 524/392 |
| 4,128,530 | 12/1978 | Cottman | 524/330 |
| 4,254,017 | 3/1981 | Dworkin et al. | 524/180 |
| 4,290,942 | 9/1981 | Schneider et al. | 524/392 |
| 4,314,934 | 2/1982 | Smith et al. | 524/181 |
| 4,315,850 | 2/1982 | Kugele | 524/330 |
| 4,440,891 | 4/1984 | Taylor et al. | 524/333 |

FOREIGN PATENT DOCUMENTS 1001344 8/1965 United Kingdom .

OTHER PUBLICATIONS

Chevassus et al.: The Stabilization of Poly-vinyl Chloride, 56–71 (1963), St. Martins Press, N.Y.
Stapfer et al.: "Antioxidative Stabilization of Polyvinyl Chloride" Polymer Preprints, 795–802, Mar. 1971, vol. 12, No. 1, American Chemical Socty. Div. Polymer Chemistry.

*Primary Examiner*—Veronica P. Hoke
*Attorney, Agent, or Firm*—Richard J. Sheridan; Gerald K. White

[57] ABSTRACT

Compositions which are effective in stabilizing polymers against the deteriorative effects of heat are provided comprising (1) an organic tin compound or mixture of organic tin compounds, (2) an organic compound having an aromatic ring which is substituted with a hydroxyl (—OH) group and a mercapto (—SH) group ortho to each other, and, optionally, (3) an organotin mercaptide or mixture of organotin mercaptides. Also provided are polymer compositions containing said stabilizers and articles of manufacture made from said stabilized polymer compositions.

4 Claims, No Drawings

STABILIZER COMPOSITIONS AND POLYMERS CONTAINING SAME

This application is a continuation of application Ser. No. 345,822, filed Feb. 4, 1982, now abandoned, which is in turn a continuation-in-part of application Ser. No. 238,517, filed Feb. 26, 1981, now U.S. Pat. No. 4,315,850.

FIELD OF INVENTION

This invention relates to new and useful polymer stabilizer compositions comprising: (1) an organic tin compound or mixture of organic tin compounds, (2) an organic compound having an aromatic ring which is substituted with a hydroxyl (—OH) group and a mercapto (—SH) group ortho to each other and, optionally, (3) an organotin mercaptide or mixture of organotin mercaptides. This invention also relates to polymer compositions comprising: (1) an organic polymer, more particularly a halogenated organic polymer, (2) an organic tin compound stabilizer or mixture of organic tin compound stabilizers, (3) an organic compound having an aromatic ring which is substituted with a hydroxyl (—OH) group and a mercapto (—SH) group ortho to each other and, optionally, (4) an organotin mercaptide or mixture of organotin mercaptides. Additionally, this invention relates to articles of manufacture, e.g. pipe, made from polymer compositions comprising: (1) an organic polymer, more particularly a halogenated organic polymer, (2) an organic tin compound stabilizer or mixture of organic tin compound stabilizers, (3) an organic compound having an aromatic ring which is substituted with a hydroxyl (—OH) group and a mercapto (—SH) group ortho to each other and, optionally, (4) an organotin mercaptide or mixture of organotin mercaptides.

BACKGROUND

It is well known that various organic polymers undergo deterioration of physical properties and color changes during processing and during exposure of the formed polymer products to various end use environmental conditions. This deterioration of physical properties and color change is particularly pronounced in some polymers (e.g. halogenated polymers) upon their exposure to heat during processing, particularly the processing into formed articles of commerce. Undesirable color changes are observed to occur at the early stages (e.g. within the first 5 to 10 minutes) of the elevated temperature processing of the polymer as well as during the prolonged exposure of the polymer to heat during processing. Sometimes haziness or cloudiness accompany the color changes of the polymer and is particularly undesirable where clear or colorless products are needed. In many methods for making a polymer into a finished product the polymer remains in the processing apparatus, exposed to high temperatures, for a short period of time and therefore the color change or discoloration of the polymer resulting from prolonged exposure to heat during processing becomes only a minor consideration. The color change of the polymer during such short exposure to heat during processing has become known as early color and is of importance in the shaping of polymers into various products (e.g. pipe), particularly products which are to be light in color.

Early color is often manifested in various degrees of yellowing of the polymer, although other coloration has also been observed in early color problems. The problem of early color has received increasing attention in recent years and has become a significant consideration in the stabilization of polymers. However, there remains considerable need for improvement of the early color heat stabilization, as well as the long term heat stabilization, of polymers.

In the heat stabilization of organic polymers (e.g. halogen containing organic polymers) early color and long term color formation have been attacked by the art with various stabilizers, mixtures of stabilizers and stabilizer compositions. Organotin compounds (e.g. diorganotin mercaptides) have been used by the art alone or in combination with various other materials (e.g. mercaptoalcohols, phenols and dihydric phenols). However, such prior art stabilizers, combinations of stabilizers and stabilizer compositions have not been entirely satisfactory for a variety of reasons including low effectiveness, high cost, instability, color and poor compatibility. Better stabilizers or stabilizer compositions are needed.

SUMMARY OF INVENTION

There has now been found a surprisingly highly effective composition for stabilizing organic polymers which overcomes many of the disadvantages of prior art stabilizers and which is effective in the early color stabilization of organic polymers during processing. Additionally, there have been surprisingly found organic polymer compositions which have improved resistance to early color formation during processing. In accordance with this invention there is provided a stabilizer composition comprising: (1) an organic tin compound or a mixture of organic tin compounds, (2) an organic compound having one or more six membered carbocyclic aromatic rings in which at least one of said aromatic rings has bonded directly thereto a total of from two to five hydroxyl (—OH) and mercapto (—SH) groups with the proviso that at least one hydroxyl group and one mercapto group are directly bonded to adjacent ring carbon atoms and, optionally, (3) an organotin mercaptide or mixture of organotin mercaptides. Further, there is now provided in accordance with this invention an organic polymer composition, having improved resistance to early color formation during processing, comprising, (1) an organic polymer normally susceptible to heat induced deterioration or discoloration, (2) an organic tin compound or mixture of organic tin compounds, (3) an organic compound having one or more six membered carbocyclic aromatic rings in which at least one of said aromatic rings has bonded directly thereto a total of from two to five hydroxyl (—OH) and mercapto (—SH) groups with the proviso that at least one hydroxyl group and one mercapto group are directly bonded to adjacent ring carbon atoms and, optionally, (4) an organotin mercaptide or mixture of organotin mercaptides. There is also now provided in accordance with this invention articles of manufacture, e.g. pipe, which are made from an organic polymer composition having improved resistance to early color formation during processing, comprising: (1) an organic polymer, more particularly a halogenated organic polymer, (2) an organic tin compound or mixture of organic tin compound, (3) an organic compound having an aromatic ring which is substituted with a hydroxyl (—OH) group and a mercapto (—SH) group ortho to each other and, optionally, (4) an organotin mercaptide or mixture of organotin mercaptides.

DESCRIPTION OF INVENTION

The stabilizer composition in accordance with this invention has unexpectedly been found to be highly effective in the stabilization of organic polymers exposed to heat during processing. More especially the stabilizer composition of this invention has been unexpectedly found to be highly effective in the early color stabilization of organic polymers exposed to heat during processing (i.e. to be highly effective in reducing or preventing discoloration of an organic polymer during the early stages of the exposure of the organic polymer to heat during processing). There has also now been unexpectedly found in accordance with this invention an advantageous polymer composition having improved stability, more particularly improved resistance to early color formation upon exposure to heat during processing. Additionally, there has now been unexpectedly found in accordance with this invention, articles of manufacture, e.g. pipe, made from polymer compositions having improved resistance to early color formation upon exposure to heat during the forming of said articles of manufacture.

In accordance with this invention, there is now provided a stabilizer composition comprising: (1) an organic tin compound or mixture of organic tin compounds, (2) an organic compound having one or more six membered carbocyclic aromatic rings in which at least one of said aromatic rings has bonded directly thereto, a total of from two to five hydroxyl (—OH) and mercapto (—SH) groups with the proviso that at least one hydroxyl group and one mercapto group are directly bonded to adjacent ring carbon atoms and, optionally, (3) an organotin mercaptide or mixture of organotin mercaptides. Further, in accordance with this invention there is now provided a polymer composition comprising: (1) an organic polymer normally susceptible to deterioration or discoloration upon exposure to heat, (2) an organic tin compound or mixture of organic tin compounds, (3) an organic compound having one or more six membered carbocyclic aromatic rings in which at least one of said aromatic rings has bonded directly thereto a total of from two to five hydroxyl (—OH) and mercapto (—SH) groups with the proviso that at least one hydroxyl group and one mercapto group are directly bonded to adjacent ring carbon atoms and, optionally, (4) an organotin mercaptide or mixture of organotin mercaptides. Additionally, there is not provided in accordance with this invention, articles of manufacture, e.g. pipe, made from a polymer composition comprising: (1) an organic polymer, more particularly a halogenated organic polymer, (2) an organic tin compound stabilizer or mixture of organic tin compound stabilizers, (3) an organic compound having an aromatic ring which is substituted with a hydroxyl (—OH) group and a mercapto (—SH) group ortho to each other and, optionally (4) an organotin mercaptide or mixture of organotin mercaptides.

In one embodiment of this invention, the stabilizer compositions comprise: (1) an organic tin compound or mixture of organic tin compounds selected from compounds having the formulas:

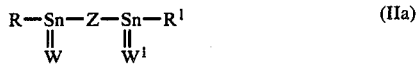

wherein
W and $W^1$ are the same or different and are oxygen or sulfur;
X is selected from

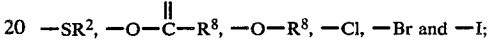

Z is 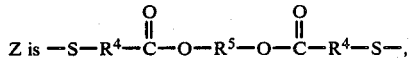

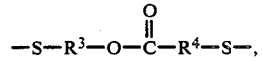

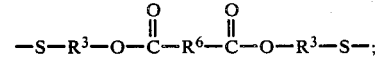

R and $R^1$ are the same or different and are selected from alkyl, aryl, alkenyl, aralkyl, alkaryl, cycloalkyl, cycloalkenyl,

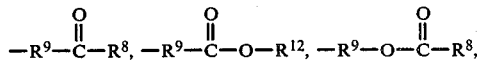

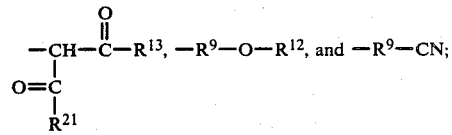

$R^2$ is alkyl, alkenyl, aryl, aralkyl, cycloalkyl, cycloalkenyl,

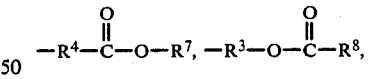

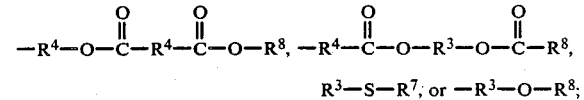

$R^3-S-R^7$, or $-R^3-O-R^8$;

$R^3$ is alkylene of at least 2 carbon atoms, arylene, alkenylene of at least 2 carbon atoms, cycloalkylene, or cycloalkenylene;
$R^4$ is alkylene, arylene, alkenylene of at least 2 carbon atoms, cycloalkylene, or cycloalkenylene;
$R^5$ is $R^3$;
$R^6$ is nothing or $R^4$;
$R^7$ is —H or $R^8$;
$R^8$ is alkyl, alkenyl, aryl, aralkyl, alkaryl, cycloalkyl, or cycloalkenyl;
$R^9$ is $C_1$ to $C_4$ alkylene;
$R^{12}$ is —H or a monovalent $C_1$ to $C_{20}$ hydrocarbon radical;

$R^{13}$ and $R^{21}$ are the same or different and are each $C_1$ to $C_{20}$ alkyl or $C_1$ to $C_{20}$ alkoxy; and $m=1$ or 2 and $t=0$ or 1 with the proviso that $m+t=2$;

(2) an organic compound or mixture of organic compounds selected from compounds having the following formulas:

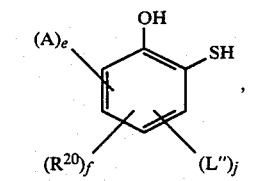
(III)

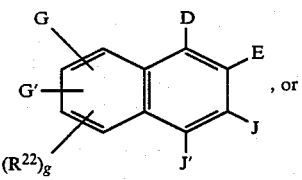
(IV)

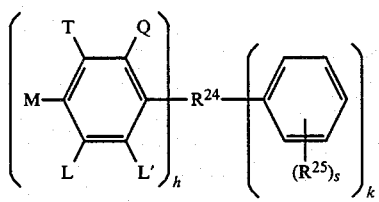
(V)

wherein
- A is nothing, —OH or —SH,
- L is nothing, —OH or —SH
- D is —H, —SH, —OH or $R^{26}$
- E is —H, —OH, —SH or $R^{26}$
- J is —H, —SH, —OH or $R^{26}$
- J' is —H, —OH, —SH or $R^{26}$
- G is nothing, —OH or —SH
- G' is nothing, —SH or —OH
- L is —H, —SH, —OH or $R^{23}$
- L' is —H, —OH, —SH or $R^{23}$
- M is —H, —SH, —OH or $R^{23}$
- T is —H, —SH, —OH or $R^{23}$
- Q is —H, —SH, —OH or $R^{23}$
- $R^{20}$ is nothing, alkyl, aryl, alkenyl, alkaryl, cycloalkyl, alkoxy or halogen,
- $R^{26}$ is alkyl, alkenyl or halogen
- $R^{22}$ is alkyl, alkenyl or halogen
- $R^{23}$ is alkyl, alkenyl or halogen
- $R^{24}$ is alkylene or alkenylene
- $R^{25}$ is alkyl, alkenyl, halogen, —SH or —OH
- e is 0 to 2
- j is 0 to 2
- f is 0 to 3
- s is 0 to 3
- g is 0 to 3
- h is 1 to 4
- k is 0 to 3
- h+k is 2 to 4
- e+j+f is 0 to 4 with the proviso that (1) in formula (IV) two of groups D, E, J and J' must be an OH group and an SH group bonded directly to adjacent ring carbon atoms, and (2) in formula (V) two of groups L, L', M, T and Q must be an OH group and an SH group bonded directly to adjacent ring carbon atoms; and optionally, (3) an organotin mercaptide or mixture of organotin mercaptides selected from compounds having the formulas:

(VI)

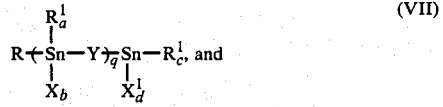
(VII)

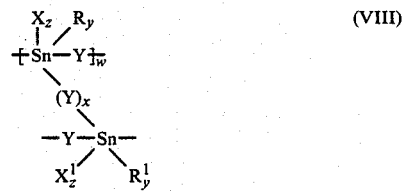
(VIII)

X is as previously defined and X and $X^1$ are the same or different and are selected from —Cl, —Br, —I, —$SR^2$,

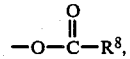

and —O—$R^8$ with the proviso that in formula (VIII) when $z=1$ and in formulas (VI) and (VII) at least one X or $X^1$ is —$SR^2$;

Y is $(S)_y$, —W—$R^3$—$W^1$—, —S—$R^4$—$\overset{O}{\underset{\|}{C}}$—O,

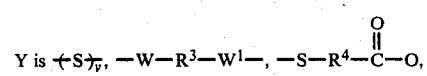

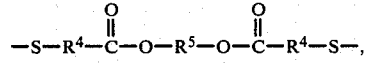

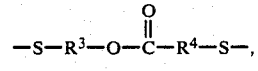

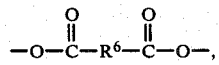

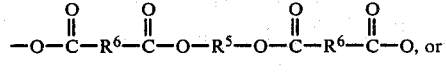

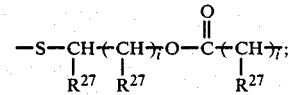

R, $R^1$, $R^2$, $R^3$, $R^4$, $R^5$, $R^6$, $R^8$, W and $W^1$ are as previously defined;

$R^{27}$ is

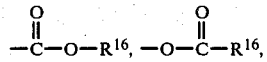

—OH, —SH, aryl, $C_1$ to $C_{18}$ alkyl or —H;

$R^{16}$ is —H or $R^8$;

i=0 or an integer from 1 to 6 inclusive;

n=0, 1 or 2, n'=0, 1 or 2 and p=1 or 2 with the proviso that n+n'=1 or 2 and n+n'+p=3;

a=0, 1 or 2, b=0, 1 or 2, q=1 to 5, c=1, 2 or 3 and d=0, 1 or 2 with the proviso that a+b=2 and c+d=3;

v=an integer from 1 to 8 inclusive; and w=0, 1 or 2, x=0 or 1, y=1 or 2, z=0 or 1 with the proviso that when x=0 then y+z=2, when x=1 then y=1, z=0 and w=1, when w=2 then x=0 and when w=0 then y+z=2, x=0 and Y is —W—R³—W¹ or

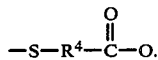

In another embodiment of this invention, the stabilizer compositions comprise: (1) an organic tin compound or mixture of organic tin compounds selected from compounds having the formula:

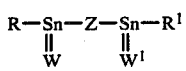 (IIa)

wherein
R, R¹, Z, W and W¹ are as previously defined; and
(2) an organic compound or mixture of organic compounds selected from compounds having the following formulas:

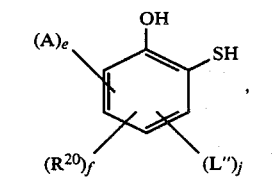 (III)

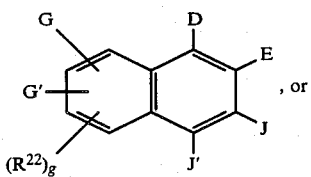 (IV)

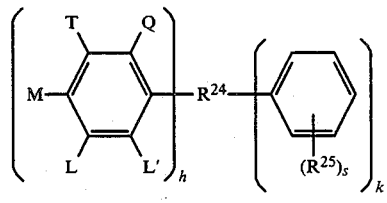 (V)

wherein
A,L'',D,E,J,J',G,G',L,L',M,T,Q, R²⁰, R²¹, R²², R²³, R²⁴, R²⁵, e, j, f, s, g, h and k are as previously defined; and optionally, (3) an organotin mercaptide or mixture of organotin mercaptides selected form compounds having the formulas:

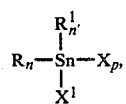 (VI)

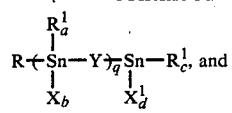 (VII)

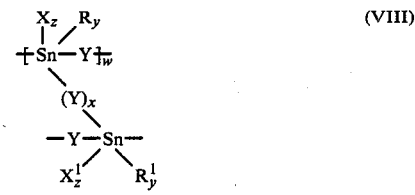 (VIII)

wherein
X, X¹, Y, R, R¹, R², R³, R⁴, R⁵, R⁶, R⁸, R¹⁶, R²⁷, W, i, n, n', p, a, b, q, c, d, v, w, x, y and z are as previously defined.

It should be noted that, in an effort to simplify the foregoing formulas and render them as clear and concise as possible, some letters are used more than once in the same formula and/or more than one formula. Thus, for example, R¹ appears twice in formula VIII, and also in formulas VI, VII and XIX. It is intended that in those instances where the same letter is used either more than once within the same formula, or in more than one formula, that letter represents at each independent occurence any group contained in the set of groups encompassed by its definition, or any and all subsets thereof. It is further intended that any modification or limitation in the definition of a particular letter at one occurence does not necessarily affect its definition at any other occurence. For example, should the definition of X in formula VI be limited from —SR²,

—OR⁸, Cl, Br or I to Cl, Br, or I, then X in each of formulas VII, VIII and XIX may still represent at each independent occurence the set of groups consisting of —SR²,

—OR⁸, Cl, Br and I, or any and all subsets thereof such as, for example, —SR²,

and —OR⁸, or Cl, Br, I and —OR⁸.

As used herein the term alkyl represents monovalent straight or branched chain hydrocarbon radicals containing, for example, 1 to 20 carbon atoms. The term aryl refers to monovalent C₆–C₁₀ aromatic rings such as benzene and naphthalene. The term alkenyl refers to monovalent straight or branched chain C₂ to C₂₀ hydrocarbon radicals containing at least one double bond. The term aralkyl represents a monovalent C₁ to C₂₀ hydrocarbon radical having attached thereto an aryl radical. The term alkaryl refers to monovalent aryl radicals having attached thereto at least one C₁–C₂₀ alkyl group. The term cycloalkyl represents monovalent $C_3$–$C_8$ saturated cycloaliphatic radicals, and the term cycloalkenyl represents $C_5$–$C_8$ cycloaliphatic radicals containing at least one double bond.

The organic tin compounds according to formulas (I) and (II) and (IIa), organic compounds according to formulas (III), (IV) and (V) and the organotin mercaptides according to formulas (VI), (VII) and (VIII) may all be prepared by methods well known in the art. For example, methods for preparing the organic tin compounds according to formulas (I) and (II), and the organotin mercaptides according to formulas (VI), (VII) and (VIII) are disclosed in U.S. Pat. Nos. 2,267,777, 2,746,946, 3,021,302, 3,565,930, 3,565,931, 3,869,487, 3,979,359, 4,118,371, 4,134,878 and 4,183,846.

In accordance with the practice of this invention, the compounds according to formulas (III), (IV) and (V) have a vicinal OH/SH arrangement (i.e. have an —OH group and an —SH group on adjacent ring carbon atoms). However, compounds according to formulas (III), (IV) and (V) may have, in addition to the first vicinal OH/SH arrangement on the ring, further vicinal OH/SH arrangements on the ring. Such additional vicinal OH/SH arrangements on the ring may be separated from the first vicinal OH/SH arrangement on the ring by one or more ring carbon atoms or may occupy a position on the ring adjacent to the first vicinal OH/SH arrangement on the ring or may include the OH or SH or both OH and SH of the first vicinal OH/SH arrangement. These arrangements of OH groups and SH groups may be illustrated by the following examples. In formula (III) the ring carbon atoms may be numbered consecutively in a clockwise manner starting at the carbon atom to which the OH group is attached as being number one. A compound according to formula (III) having the single vicinal OH/SH arrangement shown therein would have the OH group and SH group at ring carbon atoms numbered one and two respectively. Other compounds according to formula (III) having more than one vicinal OH/SH arrangement may, for example, include such compounds according to formula (III) having a further OH group at ring carbon number four and a further SH group at ring carbon number five, a compound according to formula (III) having a further OH group at ring carbon number three, or a compound according to formula (III) having a further SH group at ring carbon number 6. In a like manner, multiple vicinal OH/SH arrangements may be present in compound according to formulas (IV) and (V) in the practice of this invention.

The preferred organic tin compounds used in the practice of this invention are those compounds according to formula (I) where R is methyl, butyl or octyl and W is sulfur; or those compounds according to formula (II) where $R^1$ is methyl or butyl, W is sulfur, X is —$SR^2$ where $R^2$ is

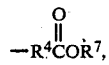

$m=1$ and $t=1$, and those compounds according to formula (IIa) where R and $R^1$ are methyl, butyl, octyl or

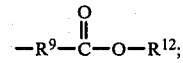

W and $W^1$ are oxygen or sulfur; and Z is

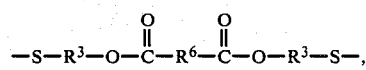

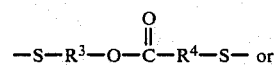

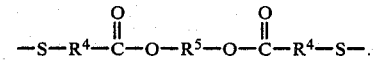

Organic tin compounds according to formulas (I) and (II) include, but are not limited to, compounds as shown in the following Table I.

TABLE I

|  |  |  |  | (I) |
| --- | --- | --- | --- | --- |

$$\left[ \begin{array}{c} R-Sn-W \\ \parallel \\ W \end{array} \right]_2$$

|  |  |  |  | (II) |
| --- | --- | --- | --- | --- |

$$R_m^1-\underset{\underset{W}{\parallel}}{Sn}-X_t$$

| R | $R^1$ | W | X | m | t |
| --- | --- | --- | --- | --- | --- |
| —$C_4H_9$ | — | S | — | — | — |
| —$C_8H_{17}$ | — | O | — | — | — |
| — | —$CH_3$ | S | —$SCH_2CH_2OCC_{17}H_{33}$ (O‖) | 1 | 1 |
| — | —$CH_3$ | S | —$SCH_2COC_8H_{17}$ (O‖) | 1 | 1 |
| — | —$CH_2CH_2COC_4H_9$ (O‖) | S | —$SCH_2CH_2COC_{18}H_{37}$ (O‖) | 1 | 1 |
| — | —$C_4H_9$ | S | — | 2 | 0 |
| — | —$C_8H_{17}$ | O | — | 2 | 0 |

Organic tin compounds according to formula (IIa) include, but are not limited to, compounds shown in the following Table Ia.

TABLE Ia $$R-\underset{\underset{W}{\parallel}}{Sn}-Z-\underset{\underset{W^1}{\parallel}}{Sn}-R^1 \quad \text{(IIa)}$$

| R and $R^1$ | W | $W^1$ | Z |
| --- | --- | --- | --- |
| —$CH_3$ | S | S | —$SCH_2CH_2OC(CH_2)_4COCH_2CH_2$—S— (O‖ ‖O) |
| —$C_4H_9$ | S | S | —$SCH_2CH_2OCCH_2CH_2S$— (O‖) |

TABLE Ia-continued $$R-\underset{\underset{W}{\|}}{Sn}-Z-\underset{\underset{W^1}{\|}}{Sn}-R^1 \quad (IIa)$$

| R and R¹ | W | W¹ | Z |
|---|---|---|---|
| $-C_8H_{17}$ | O | S | $-SCH_2\underset{\underset{O}{\|}}{C}OCH_2CH_2O\underset{\underset{O}{\|}}{C}CH_2S-$ |
| $-CH_2CH_2\underset{\underset{O}{\|}}{C}OC_4H_9$ | S | S | $-SCH_2CH_2O\underset{\underset{O}{\|}}{C}CH=CH\underset{\underset{O}{\|}}{C}OCH_2CH_2S-$ |
| $-CH_3$ | S | S | $-SCH_2\underset{\underset{C_9H_{19}}{\|}}{CH}-O\underset{\underset{O}{\|}}{C}CH=CH\underset{\underset{O}{\|}}{C}O\underset{\underset{C_9H_{19}}{\|}}{CH}CH_2S-$ |
| $-C_4H_9$ | S | S | $-S\underset{\underset{OH}{\|}}{CH}\underset{\underset{O}{\|}}{C}O(CH_2)_2S-$ |
| $-C_4H_9$ | O | O | $-S\underset{\underset{\underset{\underset{O}{\|}}{O}\underset{\underset{O}{\|}}{CCH=CH}\underset{\underset{O}{\|}}{C}OCH_3}{\|}}{CH}\underset{\underset{O}{\|}}{C}OCH_2CH_2S-$ |
| $-CH_3$ | S | S | $-SCH_2\underset{\underset{\underset{O}{\|}}{O}}{C}OCH_2\underset{\underset{(CH_2OH)_2}{\|}}{C}CH_2O\underset{\underset{O}{\|}}{C}CH_2S-$ |
| $-CH_3$ | S | S | $-SCH_2\underset{\underset{O}{\|}}{C}OCH_2\underset{\underset{(CH_2O\underset{\underset{O}{\|}}{C}CH_3)_2}{\|}}{C}CH_2O\underset{\underset{O}{\|}}{C}CH_2S-$ |

As examples of organic compounds according to formula (III), usable in the practice of this invention, there are included, but are not limited to, the following compounds:

1-hydroxy-2-mercapto benzene (ortho hydroxythiophenol)
1,3-dihydroxy-2-mercapto benzene
1,4-dihydroxy-2-mercapto benzene
1,5-dihydroxy-2-mercapto benzene
1,6-dihydroxy-2-mercapto benzene
1,3,4-trihydroxy-2-mercapto benzene
1,3,5-trihydroxy-2-mercapto benzene
1,3,6-trihydroxy-2-mercapto benzene
1,4,5-trihydroxy-2-mercapto benzene
1,4,6-trihydroxy-2-mercapto benzene
1,5,6-trihydroxy-2-mercapto benzene
1,3,4,5-tetrahydroxy-2-mercapto benzene
1,3,4,6-tetrahydroxy-2-mercapto benzene
1,4,5,6-tetrahydroxy-2-mercapto benzene
1,3,4,5,6-pentahydroxy-2-mercapto benzene
1-hydroxy-2,3-dimercapto benzene
1-hydroxy-2,4-dimercapto benzene
1-hydroxy-2,6-dimercapto benzene
1-hydroxy-2,3,5-trimercapto benzene
1-hydroxy-2,3,6-trimercapto benzene
1-hydroxy-2,3,4,5-tetramercapto benzene
1-hydroxy-2,3,4,6-tetramercapto benzene
1-hydroxy-2,3,4,5,6-pentamercapto benzene
1,3-dihydroxy-2,4-dimercapto benzene
1,3-dihydroxy-2,6-dimercapto benzene
1,3,5-trihydroxy-2,4-dimercapto benzene
1,3,5-trihydroxy-2,4,6-trimercapto benzene
1-hydroxy-2-mercapto-4-methyl benzene
1,3-dihydroxy-2-mercapto-5,6-dioctyl benzene
1-hydroxy-2-mercapto-4-phenyl benzene
1-hydroxy-2-mercapto-5-cyclohexyl benzene
1,3-dihydroxy-2-mercapto-4-butyl benzene
1-hydroxy-2,6-dimercapto-4-chloro benzene
1-hydroxy-2-mercapto-4,5-dichloro benzene
1-hydroxy-2-mercapto-4-chloro-6-hexyl benzene
1-hydroxy-2-mercapto-3-ethyl-5 isopropyl benzene Examples of compounds according to formula (IV) usable in the practice of this invention include, but are not limited to, compounds as shown in the following table 11.

TABLE II

| D | E | J | J' | R²² | G | G' | g |
|---|---|---|---|---|---|---|---|
| OH | SH | — | — | — | — | — | 0 |
| — | OH | SH | — | — | — | — | 0 |
| OH | SH | OH | — | — | — | — | 0 |
| SH | OH | OH | — | — | — | — | 0 |
| OH | SH | — | OH | — | — | — | 0 |
| SH | OH | — | SH | — | — | — | 0 |
| OH | SH | — | — | — | OH | SH | 0 |
| OH | SH | OH | OH | — | — | — | 0 |
| OH | SH | — | $-CH_3$ | — | — | — | 0 |
| SH | OH | — | $-C_2H_5$ | — | — | — | 0 |
| — | OH | SH | — | $-C_6H_{13}$ | — | — | 1 |
| OH | SH | — | $-C_4H_9$ | $-C_8H_{17}$ | — | — | 2 |
| SH | OH | $-C_3H_9$ | — | $-C_4H_9$ | OH | — | — |
| OH | SH | — | OH | $C_2H_3$ | — | — | 1 |
| — | SH | OH | — | $-C_{12}H_{25}$ | SH | OH | 1 |

TABLE II-continued

| D | E | J | J' | R²² | G | G' | g |
|---|---|---|---|---|---|---|---|
| OH | SH | —CH₃ | —CH₃ | — | — | — | 0 |
| OH | SH | — | — | Cl | — | — | 1 |
| OH | SH | — | Cl | — | — | — | 0 |
| OH | SH | — | Cl | C₁₈H₃₅ | — | — | 1 |
| OH | SH | — | Cl | — | SH | — | 0 |
| —C₂H₅ | SH | OH | —C₂H₅ | — | — | — | 0 |
| Cl | OH | SH | Cl | — | — | — | 0 |
| OH | SH | — | — | — | OH | OH | 0 |

Among examples of compounds according to formula (V) usable in the practice of this invention there are included, but not limited to, the compounds shown in the following Table III.

TABLE III

| L | L' | M | T | Q | R²⁵ | R²⁴ | h | k | s |
|---|---|---|---|---|---|---|---|---|---|
| — | — | OH | SH | — | — | CH₂ | 1 | 1 | 0 |
| — | — | OH | SH | — | — | CH₂ | 2 | 0 | 0 |
| — | — | — | OH | SH | — | CH₂ | 2 | 0 | 0 |
| — | — | — | SH | OH | — | CH₂ | 2 | 0 | 0 |
| OH | — | SH | OH | — | — | C(CH₃)₂ | 1 | 1 | 0 |
| SH | OH | — | SH | OH | — | C₄H₈ | 1 | 1 | 0 |
| — | — | OH | SH | OH | — | C₂H₂ | 1 | 1 | 0 |
| SH | C₃H₇ | OH | C₃H₇ | — | Br | C₆H₁₂ | 1 | 1 | 2 |
| OH | — | SH | OH | SH | C₆H₁₃ | CH₂ | 1 | 1 | 1 |
| OH | CH₃ | SH | — | — | — | CH₂ | 2 | 0 | 0 |
| OH | OH | SH | OH | OH | C₈H₁₇ | CH₂ | 1 | 1 | 1 |
| — | — | SH | SH | OH | C₂H₅ | C(CH₃)₂ | 1 | 1 | 2 |
| CH₃ | — | OH | SH | — | — | CH(CH₂)₃ | 3 | 0 | 0 |
| — | — | OH | SH | C₃H₇ | Cl | C₁₀H₂₄ | 1 | 1 | 1 |
| — | C₄H₉ | — | SH | OH | — | C(CH₂)₄ | 4 | 0 | 0 |
| C₈H₁₇ | — | C₈H₁₇ | OH | SH | CH₃ | C₄H₇(CH₃) | 1 | 1 | 1 |
| — | — | OH | SH | — | OH | C(CH₃)₂ | 1 | 1 | 1 |

Compounds according to formula (III) are preferably used in the practice of this invention. More preferably the compounds according to formula (III) used in the practice of this invention are ortho hydroxythiophenol and lower alkyl (i.e. $C_1$ to $C_9$ alkyl) substituted ortho hydroxythiophenols.

Where organotin mercaptides according to formulas (VI), (VII) and (VIII) are used in the practice of this invention they are preferably those compounds according to formula (VI) where R is methyl or butyl, $R^1$ is methyl or butyl, X is —SR² where $$R^2 \text{ is } -R^4\overset{O}{\underset{\|}{C}}OR^7,$$

X¹ is —SR² where R² is

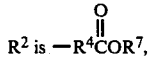

$n=1$, $n'=1$ and $p=1$; those compounds according to formula (VII) where R is methyl, X is —SR² where R² is

R¹ is methyl, X¹ is —SR² where R² is

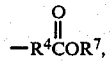

Y is —S—, $a=1$, $b=1$, $c=2$, $d=1$ and $q=1$; or those compounds according to formula (VIII) where R is methyl, R¹ is methyl, X is —SR² where R² is

X¹ is —SR² where R² is

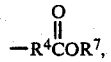

Y is —S—, $w=1$, $x=0$, $y=1$ and $z=1$.

Organotin mercaptides according to formulas (VI), (VII) and (VIII) include, but are not limited to, compounds shown in the following Tables IV, V and VI, respectively.

TABLE IV $$R_n-\underset{\underset{X^1}{|}}{\overset{\overset{R^1_{n'}}{|}}{Sn}}-X_{p'} \quad \text{(VI)}$$

| R | X and X¹ | n | n' | p |
|---|---|---|---|---|
| —CH₃ | —SCH₂COC₈H₁₇ (with C=O) | 1 | 0 | 2 |
| —C₄H₉ | —SCH₂CH₂OCC₇H₁₅ (with C=O) | 1 | 0 | 2 |
| —CH₂CH₂COC₄H₉ (with C=O) | —SCH₂CH₂OCCH₃ (with C=O) | 2 | 0 | 1 |
| —CH₃ | —SCH₂CH₂OCC₁₇H₃₅ (with C=O) | 2 | 0 | 1 |

TABLE V $$R\text{+}\underset{\underset{X^1_b}{|}}{\overset{\overset{R^1_a}{|}}{Sn}}-Y\text{)}_q\underset{\underset{X^1_d}{|}}{Sn}-R^1_c \quad \text{(VII)}$$

| R and R¹ | X | X¹ | Y | a | b | c | d | q |
|---|---|---|---|---|---|---|---|---|
| —CH₃ | —SCH₂CH₂OCC₁₁H₂₃ (with C=O) | Same as X | —S— | 0 | 2 | 1 | 2 | 1 |
| —C₈H₁₇ | —SCH₂COC₁₃H₂₇ (with C=O) | Same as X | —S— | 1 | 1 | 2 | 1 | 1 |

TABLE V-continued $$R\!\!+\!\!\underset{\underset{X_b}{\overset{R^1_a}{|}}}{Sn}\!\!-\!\!Y\!\!\underset{q}{\!\!\!\!\!\!\!\!\!\!\!\!\!\!\!\!}\!\!Sn\!\!-\!\!\underset{\underset{X^1_d}{\overset{R^1_c}{|}}}{}$$ (VII)

| R and R¹ | X | X¹ | Y | a | b | c | d | q |
|---|---|---|---|---|---|---|---|---|
| —C₄H₉ | —SCH₂CH₂OC(=O)C₈H₁₇ | Same as X | —SCH₂CH₂C(=O)— | 1 | 1 | 2 | 1 | 1 |
| —CH₂CH₂C(=O)OC₄H₉ | —SCH₂CH₂C(=O)OC₈H₁₇ | Same as X | —S—S— | 0 | 2 | 1 | 2 | 1 |
| —CH₃ | —SCH₂CH₂OC(=O)C₁₇H₃₃ | Same as X | —SCH₂C(=O)C₄H₈OC(=O)CH₂S— | 0 | 2 | 1 | 2 | 2 |
| —CH₃ | —SCH₂CH₂OC(=O)CH=CHC(=O)OCH₃ | Same as X | —S— | 0 | 2 | 1 | 2 | 1 |
| —C₄H₉ | —SCH₂CH₂OC(=O)C₁₇H₃₃ | Cl | —S— | 1 | 1 | 2 | 1 | 1 |
| —C₄H₉ | —SCH₂CH₂OC(=O)C₈H₁₇ | Same as X | —S—CH₂C(=O)— | 0 | 2 | 1 | 2 | 1 |
| —CH₃ | —SCH₂CH₂OC(=O)C₁₁H₂₃ | Same as X | —S— | 1 | 2 | 1 | 2 | 1 |
| —C₄H₉ | —SCH₂CH₂OC(=O)C₇H₁₅ | Same as X |  | 0 | 2 | 1 | 2 | 1 |

TABLE VI $$\begin{array}{c}X_z\\|\;R_y\\\!\!\!\!\!\!\!\!\!\!\!\!\!\!-\!\![Sn\!-\!Y]_w\!\!-\!\!\\(Y)_x\\-\!Y\!-\!Sn\!-\!\\X_z^1\;R_y^1\end{array}$$ (VIII)

| R and R¹ | X | Y | w | x | y | z |
|---|---|---|---|---|---|---|
| —CH₃ | — | —SCH₂CH₂OC(=O)—⌬—C(=O)OCH₂CH₂S— | 1 | 1 | 1 | 0 |

As used in Tables I–V above, and throughout this specification, the radicals —C₄H₉, —C₈H₁₇, —C₁₂H₂₅, —C₉H₁₉ and —C₁₀H₂₁ represent n-butyl, n-octyl, n-dodecyl, n-nonyl and n-decyl respectively.

The carboxyl radicals

—OC(=O)C₁₇H₃₃, —OC(=O)C₁₇H₃₅, —OC(=O)C₇H₁₅,

—OC(=O)C₁₁H₂₃ and —OC(=O)C₈H₁₇ are derived from oleic acid, stearic acid, n-octanoic acid, lauric acid, and pelargonic acid respectively. Likewise, the radicals —OC₁₃H₂₇, —OC₁₈H₃₇, and —OC₈H₁₇ are derived from tridecanol, stearyl alcohol and iso-octanol respectively.

In the stabilizer compositions of this invention the weight ratio of (a) the organic tin compound or mixture of organic tin compounds according to formulas (I), (II) and/or (IIa), to (b) the organic compound or mixture of organic compounds according to formulas (III), (IV) and (V) may vary over a wide range. There may be used a weight ratio of (a) the organic tin compound or mixture of organic tin compounds according to formulas (I), (II) and/or (IIa) to (b) the organic compound or mixture of organic compounds according to formulas (III), (IV) and (V) of from 400:1 to 1:199, preferably from 400:1 to 1:100, more preferably from 400:1 to 1:20. When the optional organotin mercaptide or mixture of organotin mercaptides according to formulas (VI), (VII) and (VIII) is employed, it is utilized in amounts such that the weight ratio of the organic tin compound or mixture or organic tin compounds according to formulas (I), (II) and/or (IIa) to organotin mercaptide or mixture of organotin mercaptides according to formulas (VI), (VII) and (VIII) is about 99:1 to about 1:99.

Various other substances may be added to or used in combination with the stabilizer composition of this invention including, for example, an innocuous diluent (e.g. hydrocarbon oil or hydrocarbon solvent), plasticizer, wax, lubricant, release agent, antioxidant, U.V. stabilizer and fire retardant well-known in the art. Methods well-known in the art for physically combining two or more materials into a homogeneous blend (i.e. a thoroughly mixed composition) may be used to prepare the stabilizer composition of this invention.

There is also now provided in accordance with this invention a polymer composition comprising (1) an organic polymer normally susceptible to thermal degradation and discoloration, (2) an organic tin compound or mixture of organic tin compounds according to formulas (I), (II) and/or (IIa), (3) an organic compound or mixture of organic compounds according to formulas (III), (IV) and (V), and, optionally, (4) an organotin mercaptide or mixture of organotin mercaptides according to formulas (VI), (VII) and (VIII).

In the practice of the polymer composition of this invention the combined amount by weight of the (a) organic tin compound or mixture of organic tin compounds according to formulas (I), (II) and/or (IIa) (b) organic compound or mixture of organic compounds according to formulas (III), (IV) and (V), and, optionally, (c) organotin mercaptide or mixture of organotin mercaptides according to formulas (VI), (VII) and (VIII) used in the polymer composition may vary over a wide range, it being necessary only that there be employed a stabilizingly effective amount. There may be employed an amount by weight of the (a) organic tin compound or mixture of organic tin compounds according to formulas (I), (II) and/or (IIa), (b) organic compound or mixture of organic compounds according to formulas (III), (IV) and (V), and, optionally, (c) organotin mercaptide or mixture of organotin mercaptides according to formulas (VI), (VII) and (VIII) that is conventionally employed by the art for adding a stabilizer to a polymer, such as 0.001 to 5%, preferably 0.01 to 2%, more preferably 0.01 to 1% by weight based on the weight of the polymer. There may be used in the practice of the polymer composition of this invention a ratio of the (a) organic tin compound or mixture of organic tin compounds according to formulas (I), (II) and/or (IIa) to (b) organic compound or mixture of organic compounds according to formulas (III), (IV) and (V), and, optionally, to (c) organotin mercaptide or mixture of organotin mercaptides according to formulas (VI), (VII) and (VIII) as previously disclosed herein for the stabilizer composition of this invention.

Conventional methods well known in the art for blending together polymers and additives may be employed to prepare the polymer compositions of this invention. The organic tin compound or mixture of organic tin compounds according to formulas (I), (II) and/or (IIa), the organic compound or mixture of organic compounds according to formulas (III), (IV) and (V), and the optional organotin mercaptide or mixture of organotin mercaptides according to formulas (VI), (VII) and (VIII) may be separately added to the polymer or they may be precombined and the combination added to the polymer. Other additives well known in the art, such as for example plasticizers, fillers, pigments, lubricants, antioxidants, fire retardants, U.V. stabilizers, antistatic agents and cross linking agents may be employed in the polymer composition of this invention.

Organic polymers normally susceptible to thermal deterioration (i.e. heat induced degradation) are generally useful in the practice of the polymer compositions of this invention. In view of their similar thermal behavior, i.e. discoloration, during elevated temperature processing and their similar capacity to dehydrohalogenate, various halogen-containing organic polymers such as vinyl halide and vinylidene halide homopolymers and copolymers could be expected to be useful in the practice of this invention. Especially preferred to be used in the polymer composition of this invention is a homopolymer or copolymer or mixture thereof of a vinyl chloride or vinylidene chloride monomer. Mixtures of organic polymers at least one of which is a homopolymer or copolymer of a vinyl halide or vinylidene halide monomer may also be used in the practice of the polymer composition of this invention. Among the halogen containing organic polymers considered to be useful in the practice of the polymer composition of this invention there are included, for example, halogenated olefin homopolymers, halogenated olefin copolymers, vinyl halide homopolymers, vinyl halide copolymers, vinylidene halide homopolymers, vinylidene halide copolymers and polymer mixtures containing said halogen containing organic polymers.

As vinyl halide homopolymers, vinyl halide copolymers and polymer blends containing vinyl halide homopolymers or vinyl halide copolymers there, for example, include (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylate, methyl alpha chloroacrylate, styrene, vinyl ethers such as vinyl ethyl ether, vinyl chloroethyl ether, vinyl phenyl ether, vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadienestyrene copolymer, and polyvinyl chloride and polyethylene and polymethyl methacrylate. Typical vinyl halide copolymers include vinyl chloride-vinyl acetate (87-13), vinyl chloride-vinylidene chloride (95-5), vinyl chloride-diethylfumarate (95-5), vinyl chloride-trichloroethylene (95-5) and vinyl chloride-2-ethylhexylacrylate (80-20). The polymer blends comprise physical blends of at least two distinct polymeric species and contain from 25 to 95 weight percent of vinyl halide homopolymer. The vinyl halide copolymers are copolymers comprising from 25 to 95 mole percent vinyl halide units.

Other halogen containing polymers may include, for example, chlorinated polyethylene having 14 to 75%, e.g. 27%, chlorine by weight, chlorinated natural and synthetic rubber, chlorinated polystyrene and rubber hydrochloride. The homopolymers and copolymers of vinyl chloride or vinylidene chloride and polymer mixtures containing said homopolymer or copolymers are preferred in the practice of the polymer composition of this invention.

The articles of manufacture in accordance with this invention may be produced by any of the well-known, conventional techniques for molding polymers.

This invention is further described by the following nonlimiting examples in which all amounts are by weight and all temperatures are in degrees Centigrade unless otherwise indicated.

The following examples teach various stabilizer compositions according to this invention.

EXAMPLES 1-7

Several mixtures are prepared by dry blending to 110° C. in a Henschel high intensity mixer (Model 2JSS) 100.0 parts of polyvinyl chloride (Geon 103EP-F-76 available commercially from B. F. Goodrich Chemical Company) with 3.0 parts of fine particle size calcium carbonate coated with calcium stearate, 1.0 part titanium dioxide, 1.2 parts paraffin wax (AD-VAWAX®165 paraffin wax available commercially from Carstab Corporation), 0.60 part calcium stearate, 0.15 part of an oxidized low molecular weight ethylene homopolymer (AC629A available commercially from Allied Chemical Corporation), and each in turn of the stabilizer compositions listed in Table A in the amounts indicated in Table A, said amounts being parts by weight of stabilizer per hundred parts polyvinyl chloride. The resulting mixture is masticated on a two-roll mill at about 193° C. Samples are taken at one minute intervals beginning after the first introduction of the mix to the mill.

The appearance of each sample taken from the mill is evaluated using the following scale:

10  9 8 7  6    5    4 3 2  1 0
White ⟶ Tan-Orange ⟶ Burn

The results of these tests are indicated in Table A.

TABLE A

| Example No. | Stabilizer | Amount of Stabilizer phr[1] | Numerical Rating After Min. | | | | | | | | | |
|---|---|---|---|---|---|---|---|---|---|---|---|---|
| | | | 1 | 2 | 3 | 4 | 5 | 6 | 7 | 8 | 9 | 10 |
| 1 | — | — | pink | | | | | | | | | |
| 2 | OHTP[2] | 0.01 | pink | | | | | | | | | |
| 3 | 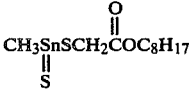 | 0.20 | 9+ | 8 | 7 | 6+ | 6 | 5 | 4 | 3 | 1 | 0 |
| 4 | <br>OHTP | 0.20<br>0.01 | 10+ | 10 | 9 | 9 | 8 | 7 | 6 | 5 | 2 | 1 |
| 5 | 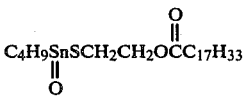<br>OHTP | 0.23<br>0.01 | 10+ | 10 | 9+ | 9 | 7+ | 6 | 4 | 2 | 1 | 0 |
| 6 | Mixture of equal wt. proportions of:<br>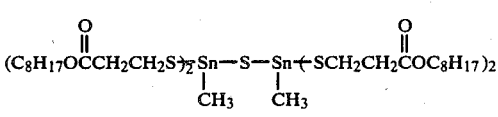MMBP[3] | 0.40<br><br>0.10 | 10+ | 10+ | 9+ | 7 | 5+ | 5 | 4 | 2 | 2 | 0 |
| 7 | Mixture of equal wt. proportions of:<br> | 0.40 | 10+ | 10 | 10 | 9 | 8 | 7 | 5 | 3 | 1 | 1 |

TABLE A-continued

| Example No. | Stabilizer | Amount of Stabilizer phr[1] | Numerical Rating After Min. | | | | | | | | | |
|---|---|---|---|---|---|---|---|---|---|---|---|---|
| | | | 1 | 2 | 3 | 4 | 5 | 6 | 7 | 8 | 9 | 10 |
| | MNP[4] | 0.06 | | | | | | | | | | |

[1] phr = parts per hundred parts of polyvinyl chloride
[2] OHTP is ortho-hydroxythiophenol
[3] MMBP is 2-mercapto-4-methyl-6-t-butylphenol
[4] MNP is 2-mercapto-4-nonylphenol Numerical ratings in the Table A illustrate that improved early color is obtained with stabilizer compositions of this invention.

The following stabilizer compositions according to this invention are prepared and tested in the same manner as those of Examples 1–7 with substantially equivalent results.

EXAMPLES 8–16

| Example No. | Stabilizer | Amount of Stabilizer, phr |
|---|---|---|
| 8 | $CH_3-\underset{\underset{S}{\|}}{\overset{}{Sn}}-SCH_2CH_2\overset{O}{\overset{\|}{C}}OC_8H_{17}$ | 0.20 |
| | OHTP | 0.01 |
| 9 | $(C_4H_9O\overset{O}{\overset{\|}{C}}CH_2CH_2)_2\underset{\underset{S}{\|}}{\overset{}{Sn}}$ | 0.23 |
| | OHTP | 0.02 |
| 10 | Mixture of equal wt. proportions of: $C_4H_9-\underset{\underset{S}{\|}}{\overset{}{Sn}}-S-\underset{\underset{S}{\|}}{\overset{}{Sn}}-C_4H_9$ | 0.24 |
| | and $(C_4H_9)_2Sn(SC_4H_9)_2$ | 0.06 |
| | OHTP | |
| 11 | Mixture of equal wt. proportions of: $CH_3-\underset{\underset{S}{\|}}{\overset{}{Sn}}-SCH_2\overset{O}{\overset{\|}{C}}OC_8H_{17}$ and $C_4H_9O\overset{O}{\overset{\|}{C}}CH_2S-\underset{\underset{C_4H_9}{\|}}{\overset{\overset{C_4H_9}{\|}}{Sn}}-SCH_2CH_2\overset{O}{\overset{\|}{C}}-O-\underset{\underset{C_4H_9}{\|}}{\overset{\overset{C_4H_9}{\|}}{Sn}}-SCH_2\overset{O}{\overset{\|}{C}}OC_4H_9$ | 0.35 |
| | DBTP[5] | 0.02 |
| 12 | Mixture of equal wt. proportions of: $C_4H_9-\underset{\underset{S}{\|}}{\overset{}{Sn}}-S-\underset{\underset{S}{\|}}{\overset{}{Sn}}-C_4H_9$ and $CH_3Sn(SCH_2\overset{O}{\overset{\|}{C}}OC_8H_{17})_3$ | 0.40 |
| | OHTP | 0.001 |
| 13 | $CH_3\overset{S}{\overset{\|}{Sn}}SCH_2CH_2O\overset{O}{\overset{\|}{C}}(CH_2)_4\overset{O}{\overset{\|}{C}}OCH_2CH_2S\overset{S}{\overset{\|}{Sn}}CH_3$ | 0.25 |
| | t-butyl—[phenol ring with OH, SH, CH₃ substituents] | 0.02 |
| 14 | $CH_3\overset{S}{\overset{\|}{Sn}}SCH_2\overset{O}{\overset{\|}{C}}CH_2\underset{(CH_2OH)_2}{\overset{}{C}}CH_2\overset{O}{\overset{\|}{C}}OCH_2S\overset{S}{\overset{\|}{Sn}}CH_3$ | 0.25 |

-continued

| Example No. | Stabilizer | Amount of Stabilizer, phr |
|---|---|---|
|  | 4-nonyl-2-mercaptophenol (OH, SH, C₉H₁₉ on benzene) | 0.005 |
| 15 | $C_4H_9SnSCH_2CH_2OCCH_2CH_2SSnC_4H_9$ (with S, O, S double bonds) | 0.20 |
|  | $C_4H_9Sn(SCH_2CH_2OCC_7H_{15})_3$ (with O double bond) | 0.20 |
|  | 1-hydroxy-2-mercaptonaphthalene | 0.001 |
| 16 | $CH_3SnSCH_2CH_2OC(CH_2)_4COCH_2CH_2SSnCH_3$ (with S, O, O, S double bonds) | 0.25 |
|  | $H_{17}C_8OCCH_2CH_2S{-}Sn{-}SCH_2CH_2COSn{-}SCH_2CH_2OCC_8H_{17}$, with $(C_4H_9)_2$ on each Sn | 0.25 |
|  | 2-mercaptophenol (OH, SH on benzene) | 0.20 |

(5)DBTP is 2-mercapto-4,6-di-t-butylphenol

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while a few specific embodiments of this invention have been described in considerable detail, variations and modifications of these embodiments can be effected without departing from the spirit and scope of the invention as disclosed and claimed.

What I claim and desire to protect by Letters Patent is:

1. A stabilizer composition comprising:
A. an organic tin compound or mixture of organic tin compounds selected from compounds having the formulas:

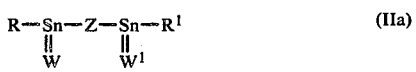

wherein
W and W¹ are the same or different and are oxygen or sulfur;
Z is

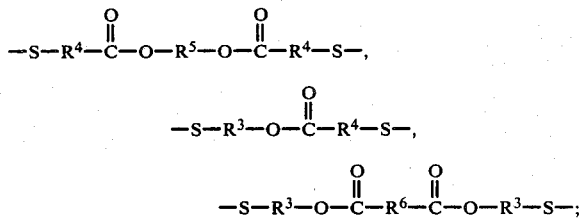

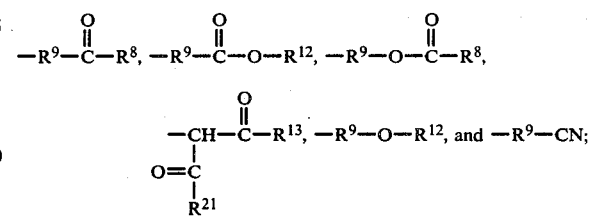

R and R¹ are the same or different and are selected from alkyl, aryl, alkenyl, aralkyl, alkaryl, cycloalkyl, cycloalkenyl, $$-R^9-\overset{O}{\underset{\|}{C}}-R^8, -R^9-\overset{O}{\underset{\|}{C}}-O-R^{12}, -R^9-O-\overset{O}{\underset{\|}{C}}-R^8,$$

$$-\underset{\underset{R^{21}}{\overset{|}{C}}}{\overset{|}{CH}}-\overset{O}{\underset{\|}{C}}-R^{13}, -R^9-O-R^{12}, \text{ and } -R^9-CN;$$

R³ is alkylene of at least 2 carbon atoms, arylene, alkenylene of at least 2 carbon atoms, cycloalkylene, or cycloalkylene
R⁴ is alkylene, arylene, alkenylene of at least 2 carbon atoms, cycloalkylene, or cycloalkenylene;

$R^5$ is $R^3$;
$R^6$ is nothing or $R^4$;
$R^8$ is alkyl, alkenyl, aryl, aralkyl, alkaryl, cycloalkyl, or cycloalkenyl;
$R^9$ is $C_1$ to $C_4$ alkylene;
$R^{12}$ is —H or a monovalent $C_1$ to $C_{20}$ hydrocarbon radical;
$R^{13}$ and $R^{21}$ are the same or different and are each $C_1$ to $C_{20}$ alkyl or $C_1$ to $C_{20}$ alkoxy; and B. an organic compound or mixture of organic compounds selected from compounds having the following formulas:

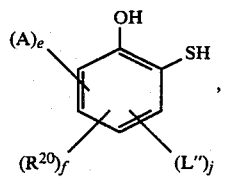   (III)

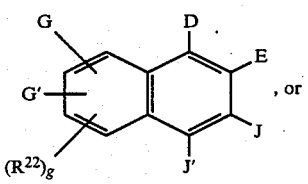   (IV)

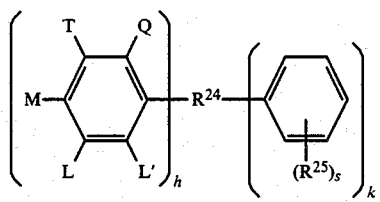   (V)

wherein
A is nothing, —OH or —SH,
L'' is nothing, —OH or —SH
D is —H, —SH, —OH or $R^{26}$
E is —H, —OH, —SH or $R^{26}$
J is —H, —SH, —OH or $R^{26}$
J' is —H, —OH, —SH or $R^{26}$
G is nothing, —OH or —SH
G' is nothing, —SH or —OH
L is —H, —SH, —OH or $R^{23}$
L' is —H, —OH, —SH or $R^{23}$
M is —H, —SH, —OH or $R^{23}$
T is —H, —SH, —OH or $R^{23}$
Q is —H, —SH, —OH or $R^{23}$
$R^{20}$ is nothing, alkyl, aryl, alkenyl, alkaryl, cycloalkyl, alkoxy or halogen,
$R^{26}$ is alkyl, alkenyl or halogen
$R^{22}$ is alkyl, alkenyl or halogen
RHU 23 is alkyl, alkenyl or halogen
$R^{24}$ is alkylene or alkenylene
$R^{25}$ is alkyl, alkenyl, halogen, —SH or —OH
e is 0 to 2
j is 0 to 2
f is 0 to 3
s is 0 to 3
g is 0 to 3
h is 1 to 4
k is 0 to 3
h+k is 2 to 4
e+j+f is 0 to 4
with the proviso that (1) in formula (IV) two of groups D, E, J and J' must be an OH group and an SH group bonded direct to adjacent ring carbon atoms, and (2) in formula (V) two of groups L, L', M, T and Q must be an OH group and an SH group bonded directly to adjacent ring carbon atoms.

2. The stabilizer composition of claim 1 further comprising an organotin mercaptide or mixture of organotin mercaptides selected from compounds having the formulas:

   (VI)

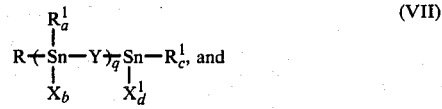   (VII)

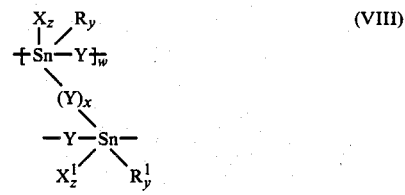   (VIII)

wherein
R and $R^1$ are the same or different and are selected from alkyl aryl, alkenyl, aralkyl, alkaryl, cycloalkyl, cycloalkenyl

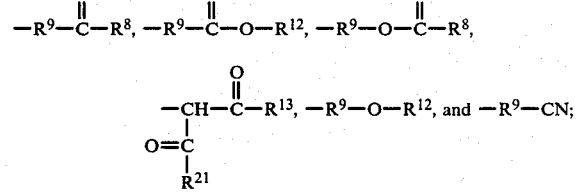

X and $X^1$ are the same or different and are selected from —Cl, —Br, —I, —$SR^2$,

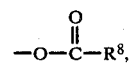

and —O—$R^8$ with the proviso that in formula (VIII) when z=1 and in formulas (VI) and (VII) at least one X or $X^1$ is —$SR^2$;
$R^8$ is alkyl, alkenyl, aryl, aralkyl, alkaryl, cycloalkyl, or cycloalkenyl;
$R^9$ is $C_1$ to $C_4$ alkylene;
$R^{12}$ is —H or a monovalent $C_1$ to $C_{20}$ hydrocarbon radical;
$R^{13}$ and $R^{21}$ are the same or different and are each $C_1$ to $C_{20}$ alkyl or $C_1$ to $C_{20}$ alkoxy;

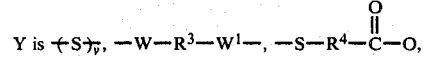

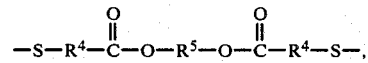

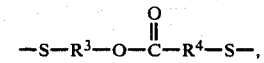

-continued

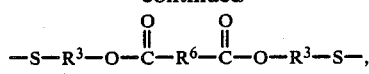

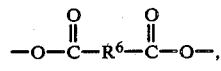

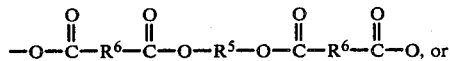

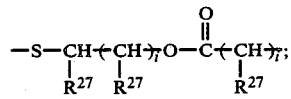

W and W¹ are the same or different and are oxygen or sulfur;

R³ is alkylene of at least 2 carbon atoms, arylene, alkenylene of at least 2 carbon atoms, cycloalkylene, or cycloalkenyl;

R⁴ is alkylene, arylene, alkenylene of at least 2 carbon atoms, cycloalkylene, or cycloalkenylene;

R⁵ is R³;

R⁶ is nothing or R⁴;

R² is alkyl, alkenyl, aryl, hydroxy-substituted aryl, aralkyl, cycloalkyl, cycloalkenyl,

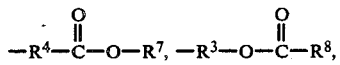

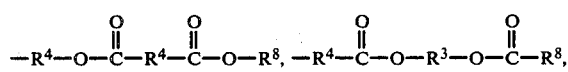

-continued
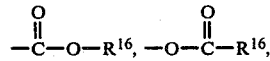

R⁷ is —H or R⁸;

R²⁷ is $$-\overset{O}{\underset{\|}{C}}-O-R^{16}, -O-\overset{O}{\underset{\|}{C}}-R^{16},$$

—OH, —SH, aryl, $C_1$ to $C_{18}$ alkyl or —H;

R¹⁶ is —H or R⁸;

i=0 or an integer from 1 to 6 inclusive;

n=0, 1 or 2, n'=0, 1 or 2 and p=1 or 2 with the proviso that n+n'=1 or 2 and n+n'+p=3;

a=0, 1 or 2, b=0, 1 or 2, q=1 to 5, c=1, 2 or 3 and d=0, 1 or 2 with the proviso that a+b=2 and c+d=3;

v=an integer from 1 to 8 inclusive; and w=0, 1 or 2, x=0 or 1, y=1 or 2, z=0 or 1 with the proviso that when x=0 then y+z=2, when x=1 then y=1, z=0 and w=1, when w=2 then x=0 and when w=0 then y+z=2, x=0 and Y is —W—R³—W¹ or

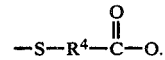

3. A polymer composition comprising a halogen-containing organic polymer and, in an amount effective to stabilize said polymer against the deteriorative effects of heat, the stabilizer composition of claim 1.

4. A polymer composition comprising a halogen-containing organic polymer and, in an amount effective to stabilize said polymer against the deteriorative effects of heat, the stabilizer composition of claim 2.

* * * * *

UNITED STATES PATENT AND TRADEMARK OFFICE
CERTIFICATE OF CORRECTION

PATENT NO. : 4,558,083
DATED : Dec. 10, 1985
INVENTOR(S) : Thomas G. Kugele

It is certified that error appears in the above-identified patent and that said Letters Patent is hereby corrected as shown below:

Column 6, lines 15-20, formula (VIII) should read:

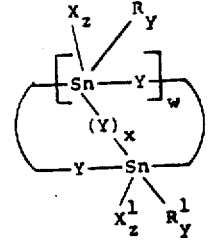

Column 8, lines 8-14, formula (VIII) should read:

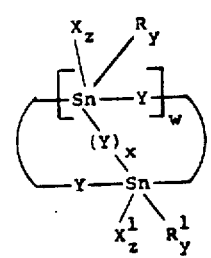

UNITED STATES PATENT AND TRADEMARK OFFICE
CERTIFICATE OF CORRECTION

PATENT NO. : 4,558,083

DATED : Dec. 10, 1985

INVENTOR(S) : Thomas G. Kugele

It is certified that error appears in the above-identified patent and that said Letters Patent is hereby corrected as shown below:

Column 26, lines 18-25, formula (VIII) should read:

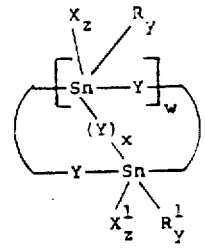

Signed and Sealed this

Twenty-ninth Day of October, 1991

*Attest:*

HARRY F. MANBECK, JR.

*Attesting Officer*   *Commissioner of Patents and Trademarks*